(12) United States Patent
Wang

(10) Patent No.: US 11,958,121 B2
(45) Date of Patent: Apr. 16, 2024

(54) RECIPROCATING TOOL HAVING ORBIT FUNCTION

(71) Applicant: Black & Decker Inc., New Britain, CT (US)

(72) Inventor: Yanchao Wang, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 20 days.

(21) Appl. No.: 17/653,547

(22) Filed: Mar. 4, 2022

(65) Prior Publication Data

US 2023/0278116 A1 Sep. 7, 2023

(51) Int. Cl.
| | |
|---|---|
| *B23D 49/16* | (2006.01) |
| *B23D 49/10* | (2006.01) |
| *B23D 51/16* | (2006.01) |

(52) U.S. Cl.
CPC ......... *B23D 49/165* (2013.01); *B23D 49/105* (2013.01); *B23D 49/167* (2013.01); *B23D 51/16* (2013.01)

(58) Field of Classification Search
CPC ........ B26B 1/00; B23D 49/10; B23D 49/162; B23D 49/165; B23D 51/16; B23D 51/20
See application file for complete search history.

(56) References Cited

U.S. PATENT DOCUMENTS

| | | | |
|---|---|---|---|
| 1,362,628 A | 12/1920 | Lewis | |
| 1,525,070 A | 2/1925 | Coleman | |
| 2,240,755 A | 5/1941 | Martin | |
| 2,610,524 A | 9/1952 | Maust | |
| 2,704,941 A | 3/1955 | Holford | |
| 2,931,402 A | 4/1960 | Papworth | |
| 2,949,944 A | 8/1960 | Blachly | |
| 2,966,178 A | 12/1960 | Katzfey | |
| 2,970,484 A | 2/1961 | Springer | |
| 3,095,748 A | 7/1963 | Stelljes et al. | |

(Continued)

FOREIGN PATENT DOCUMENTS

| | | |
|---|---|---|
| CN | 2853254 Y | 1/2007 |
| CN | 104209586 A | 12/2014 |

(Continued)

OTHER PUBLICATIONS

International Search Report and Written Opinion for PCT Application No. PCT/US2023/063670, dated Jun. 14, 2023, 7 pages.

*Primary Examiner* — Jennifer S Matthews
(74) *Attorney, Agent, or Firm* — Brake Hughes Bellermann LLP

(57) ABSTRACT

A reciprocating power tool may include a driving system driving a reciprocating mechanism. A selection mechanism provides for selection of a linear mode of operation or at least one orbital mode of operation. Motion of a reciprocating shaft of the reciprocating mechanism may be guided by a guide bracket fixed in the housing and an orbit bushing movably coupled in the housing. The guide bracket may include at least one guide slot having a contoured guide surface that guides the motion of the corresponding end portion of the reciprocating shaft. The contoured guide surface may guide the corresponding end portion of the reciprocating shaft in a corresponding direction relative to the longitudinal centerline of the at least one guide slot during an out stroke and a return stroke of the reciprocating stroke.

19 Claims, 13 Drawing Sheets

(56) References Cited

U.S. PATENT DOCUMENTS

| | | |
|---|---|---|
| 3,205,721 A | 9/1965 | Speer |
| 3,206,989 A | 9/1965 | Enders |
| 3,229,793 A | 1/1966 | Jacobson |
| 3,246,528 A | 4/1966 | Kosch |
| 3,270,369 A | 9/1966 | William |
| 3,309,932 A | 3/1967 | Davis |
| 3,451,276 A | 6/1969 | Wadlow et al. |
| 3,457,796 A | 7/1969 | Leach et al. |
| 3,461,732 A | 8/1969 | Gregory |
| 3,482,458 A | 12/1969 | Bednarski |
| 3,655,021 A | 4/1972 | Froio |
| 3,688,522 A | 9/1972 | Schmuck |
| 3,729,823 A | 5/1973 | Bos et al. |
| 3,750,483 A | 8/1973 | Burrows et al. |
| 3,766,362 A | 10/1973 | Pell et al. |
| 3,978,862 A | 9/1976 | Morrison |
| 4,145,811 A | 3/1979 | Kendzior |
| 4,385,443 A | 5/1983 | Obanion |
| 4,482,042 A | 11/1984 | Siska et al. |
| 4,542,812 A | 9/1985 | Westley |
| 4,884,344 A | 12/1989 | Martinez et al. |
| 5,009,012 A | 4/1991 | Martinez et al. |
| 5,025,562 A | 6/1991 | Palm |
| 5,050,307 A | 9/1991 | Palm |
| 5,099,705 A | 3/1992 | Dravnieks |
| 5,134,777 A | 8/1992 | Meyer et al. |
| 5,212,887 A | 5/1993 | Farmerie |
| 5,392,519 A | 2/1995 | Inoue et al. |
| RE35,258 E | 6/1996 | Palm |
| 5,561,909 A | 10/1996 | Berg et al. |
| 5,566,458 A | 10/1996 | Palm |
| 5,598,636 A | 2/1997 | Stolzer |
| 5,607,023 A | 3/1997 | Palm |
| 5,653,030 A | 8/1997 | Yokoyama et al. |
| 5,689,891 A | 11/1997 | Bednar et al. |
| 5,806,191 A | 9/1998 | Yokoyama et al. |
| 5,964,039 A | 10/1999 | Mizoguchi et al. |
| 6,012,346 A | 1/2000 | Vo |
| 6,209,208 B1 | 4/2001 | Marinkovich et al. |
| 6,212,781 B1 | 4/2001 | Marinkovich et al. |
| RE37,211 E | 6/2001 | Bednar et al. |
| 6,249,979 B1 | 6/2001 | Bednar et al. |
| 6,260,281 B1 | 7/2001 | Okumura et al. |
| 6,282,797 B1 * | 9/2001 | Osada .................. B23D 49/165 30/392 |
| 6,286,217 B1 | 9/2001 | Dassoulas et al. |
| 6,295,910 B1 | 10/2001 | Childs et al. |
| RE37,529 E | 1/2002 | Bednar et al. |
| 6,357,125 B1 | 3/2002 | Feldmann et al. |
| D455,328 S | 4/2002 | Bruno |
| 6,370,781 B1 | 4/2002 | Sasaki |
| 6,508,151 B1 | 1/2003 | Neitzell |
| 6,634,107 B2 | 10/2003 | Osada |
| 6,634,437 B1 | 10/2003 | Rudolph |
| 6,662,455 B2 | 12/2003 | Tachibana et al. |
| 6,688,005 B1 | 2/2004 | Tachibana et al. |
| 6,742,267 B2 | 6/2004 | Marinkovich et al. |
| 6,758,119 B1 | 7/2004 | Neitzell |
| RE38,606 E | 10/2004 | Bednar et al. |
| 6,829,831 B1 | 12/2004 | Neitzell |
| 6,851,193 B2 | 2/2005 | Bednar et al. |
| 6,860,886 B1 | 3/2005 | Lee |
| 6,877,235 B2 | 4/2005 | Osada |
| 6,976,313 B2 | 12/2005 | Wong |
| 7,127,973 B2 | 10/2006 | Neitzell et al. |
| 7,188,425 B2 | 3/2007 | Bednar et al. |
| 7,191,847 B2 | 3/2007 | Haas |
| 7,216,433 B2 | 5/2007 | Haas et al. |
| 7,225,546 B2 | 6/2007 | Hartmann |
| 7,290,343 B2 | 11/2007 | Hartmann |
| 7,363,713 B2 | 4/2008 | Kobayashi et al. |
| 7,448,137 B2 | 11/2008 | Neitzell et al. |
| 7,506,447 B2 | 3/2009 | Wheeler et al. |
| 7,637,018 B2 | 12/2009 | Zhang |
| 7,707,729 B2 | 5/2010 | Moreno |
| 7,793,420 B2 | 9/2010 | Griep et al. |
| 7,818,887 B2 | 10/2010 | Saegesser et al. |
| 7,886,841 B2 | 2/2011 | Armstrong |
| 7,996,996 B2 | 8/2011 | Hirabayashi |
| 8,230,608 B2 | 7/2012 | Oberheim |
| 8,307,910 B2 | 11/2012 | Holmes et al. |
| D674,263 S | 1/2013 | Aglassinger |
| 8,371,032 B2 | 2/2013 | Hirabayashi |
| 8,403,075 B2 | 3/2013 | Schlesak et al. |
| 8,407,901 B2 | 4/2013 | Oberheim |
| 8,407,902 B2 | 4/2013 | Naughton et al. |
| 8,763,722 B2 | 7/2014 | Braun et al. |
| 8,813,373 B2 | 8/2014 | Scott |
| 8,905,153 B2 | 12/2014 | Braun et al. |
| 9,061,411 B2 | 6/2015 | Naughton et al. |
| 9,132,491 B2 | 9/2015 | Alberti et al. |
| 9,156,097 B2 | 10/2015 | Neitzell et al. |
| 9,233,427 B2 | 1/2016 | Alberti et al. |
| 9,272,347 B2 | 3/2016 | Holmes et al. |
| 9,393,681 B2 | 7/2016 | Werner |
| 9,470,273 B2 | 10/2016 | Lang et al. |
| 9,561,552 B2 | 2/2017 | Kocsis et al. |
| 9,573,207 B2 | 2/2017 | Sugita et al. |
| 9,579,735 B2 | 2/2017 | Wattenbach et al. |
| 9,724,771 B2 | 8/2017 | Aoki et al. |
| 9,776,263 B2 | 10/2017 | Adams et al. |
| 9,956,625 B2 | 5/2018 | Adams et al. |
| 10,144,106 B2 | 12/2018 | McLain et al. |
| 10,259,060 B2 | 4/2019 | Sugino et al. |
| 10,300,541 B2 | 5/2019 | Adams et al. |
| 10,464,148 B2 | 11/2019 | Wattenbach et al. |
| 11,229,963 B2 | 1/2022 | Mougeotte et al. |
| 2003/0121389 A1 | 7/2003 | Wheeler et al. |
| 2004/0194987 A1 | 10/2004 | Hanke et al. |
| 2004/0231170 A1 | 11/2004 | Neitzell et al. |
| 2004/0261273 A1 | 12/2004 | Griep et al. |
| 2005/0016001 A1 | 1/2005 | Griep et al. |
| 2005/0178012 A1* | 8/2005 | Neitzell ............... B23D 49/165 30/392 |
| 2005/0252670 A1 | 11/2005 | Prell et al. |
| 2006/0124331 A1 | 6/2006 | Stirm et al. |
| 2007/0017684 A1 | 1/2007 | Stirm et al. |
| 2007/0074407 A1 | 4/2007 | Serdynski et al. |
| 2007/0135803 A1 | 6/2007 | Belson |
| 2008/0251568 A1 | 10/2008 | Zemlok et al. |
| 2008/0287944 A1 | 11/2008 | Pearson et al. |
| 2008/0289843 A1 | 11/2008 | Townsan |
| 2008/0308602 A1 | 12/2008 | Timm et al. |
| 2008/0308606 A1 | 12/2008 | Timm et al. |
| 2008/0308607 A1 | 12/2008 | Timm et al. |
| 2010/0162579 A1 | 7/2010 | Naughton et al. |
| 2010/0320252 A1 | 12/2010 | Viola et al. |
| 2011/0107608 A1* | 5/2011 | Wattenbach ......... F16J 15/3232 30/394 |
| 2011/0139475 A1 | 6/2011 | Braun et al. |
| 2011/0315413 A1 | 12/2011 | Fisher et al. |
| 2012/0096721 A1 | 4/2012 | Sinur |
| 2012/0192440 A1 | 8/2012 | Jerabek et al. |
| 2012/0261153 A1 | 10/2012 | Aoki |
| 2013/0019483 A1 | 1/2013 | Naughton et al. |
| 2013/0055576 A1 | 3/2013 | Holmes et al. |
| 2013/0062090 A1 | 3/2013 | Winnard |
| 2013/0199812 A1 | 8/2013 | Dangelmaier et al. |
| 2013/0247391 A1 | 9/2013 | Armstrong |
| 2014/0171966 A1 | 6/2014 | Giordano et al. |
| 2014/0245620 A1 | 9/2014 | Fankhauser et al. |
| 2014/0299345 A1 | 10/2014 | McRoberts et al. |
| 2015/0136433 A1 | 5/2015 | Nitsche et al. |
| 2015/0296719 A1 | 10/2015 | Kuehne et al. |
| 2016/0243634 A1 | 8/2016 | Komazaki |
| 2017/0129026 A1 | 5/2017 | Wattenbach et al. |
| 2018/0021867 A1* | 1/2018 | Naoi ..................... B23D 51/02 30/394 |
| 2018/0370012 A1 | 12/2018 | Zheng |
| 2019/0061081 A1 | 2/2019 | Schaer |
| 2019/0275597 A1 | 9/2019 | Adams et al. |
| 2020/0009668 A1 | 1/2020 | Adams et al. |
| 2020/0030897 A1 | 1/2020 | Wattenbach et al. |

(56) References Cited

U.S. PATENT DOCUMENTS

| | | | |
|---|---|---|---|
| 2020/0063827 A1 | 2/2020 | Courtial et al. | |
| 2020/0070265 A1 | 3/2020 | Wang | |
| 2020/0094432 A1 | 3/2020 | Monzen et al. | |

FOREIGN PATENT DOCUMENTS

| | | | | |
|---|---|---|---|---|
| CN | 104416225 A | 3/2015 | | |
| DE | 803142 C | 3/1951 | | |
| DE | 1870185 U | 4/1963 | | |
| DE | 1673054 A1 | 8/1971 | | |
| DE | 3446278 A1 | 6/1986 | | |
| DE | 4009911 A1 | 10/1990 | | |
| DE | 102007017408 B3 | 8/2008 | | |
| DE | 102007062869 A1 | 8/2008 | | |
| DE | 102008042861 A1 | 4/2010 | | |
| DE | 102011077259 A1 | 12/2012 | | |
| DE | 102012210678 A1 | 1/2014 | | |
| DE | 102006041430 B4 | 3/2015 | | |
| DE | 102017115754 A1 | 1/2018 | | |
| DE | 202020102899 U1 * | 7/2020 | | ............ B23D 49/10 |
| EP | 0561473 B1 | 1/1998 | | |
| EP | 1980351 A2 | 10/2008 | | |
| EP | 2903770 A2 | 8/2015 | | |
| EP | 2481508 B1 | 6/2016 | | |
| EP | 3053686 A1 | 8/2016 | | |
| EP | 2119536 B1 | 8/2017 | | |
| EP | 3038779 B1 | 3/2020 | | |
| EP | 3038780 B1 | 4/2020 | | |
| EP | 3632603 A1 | 4/2020 | | |
| FR | 2451242 A1 | 10/1980 | | |
| GB | 891832 A | 3/1962 | | |
| GB | 2042973 A | 10/1980 | | |
| GB | 2234034 A | 1/1991 | | |
| GB | 2252072 A | 7/1992 | | |
| JP | 2007118181 A * | 5/2007 | | ........... B23D 49/165 |
| JP | 4147673 B2 * | 9/2008 | | ........... B23D 49/165 |
| JP | 2009083332 A | 4/2009 | | |
| JP | 2009101432 A | 5/2009 | | |
| JP | 2011115912 A | 6/2011 | | |
| JP | 2014525354 A | 9/2014 | | |
| WO | 2006065728 A2 | 6/2006 | | |
| WO | 2015145912 A1 | 10/2015 | | |
| WO | 2015155912 A1 | 10/2015 | | |
| WO | 2019235065 A1 | 12/2019 | | |

\* cited by examiner

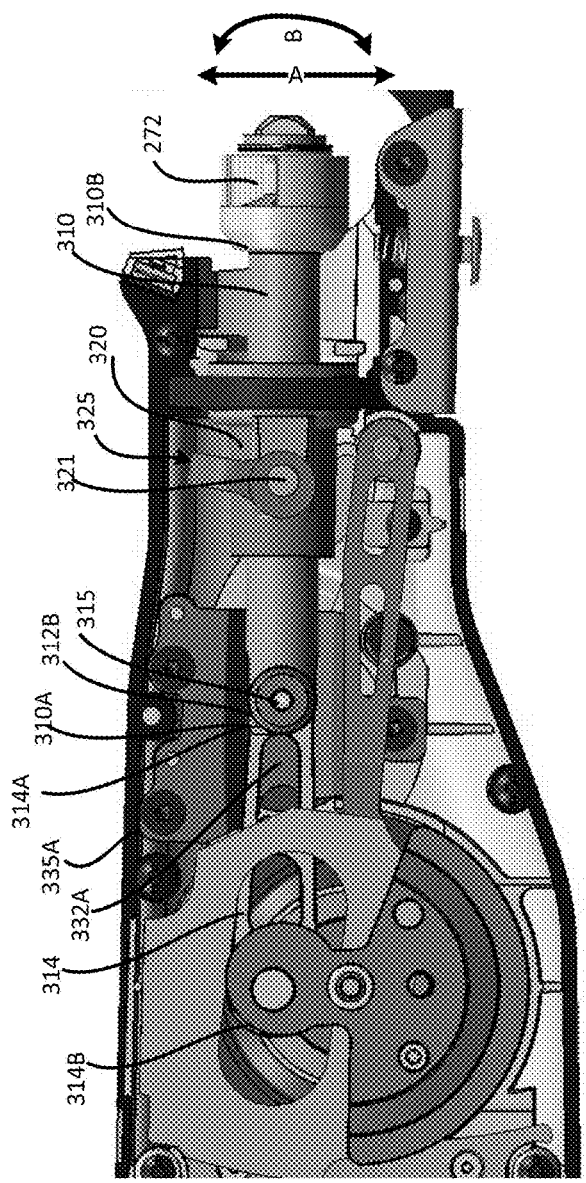
FIG. 3D(1)
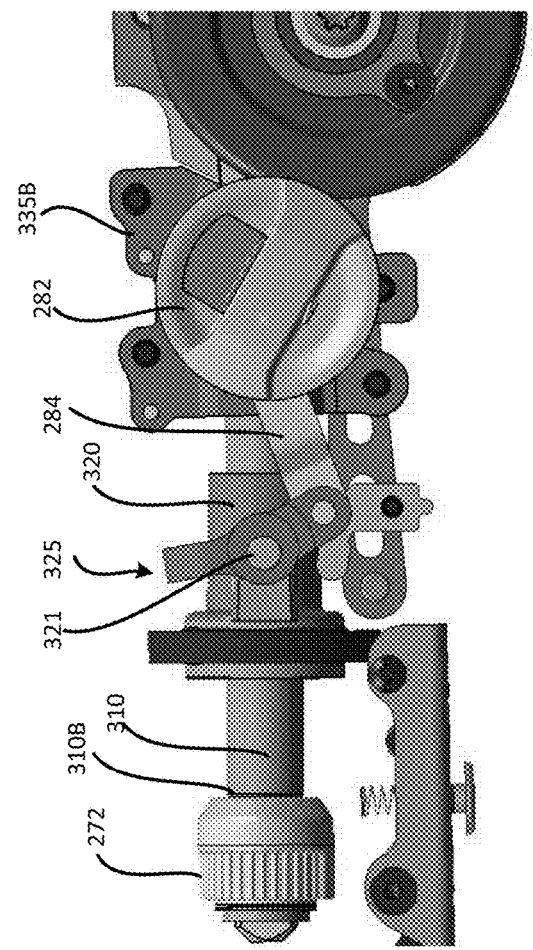
FIG. 3D(2)

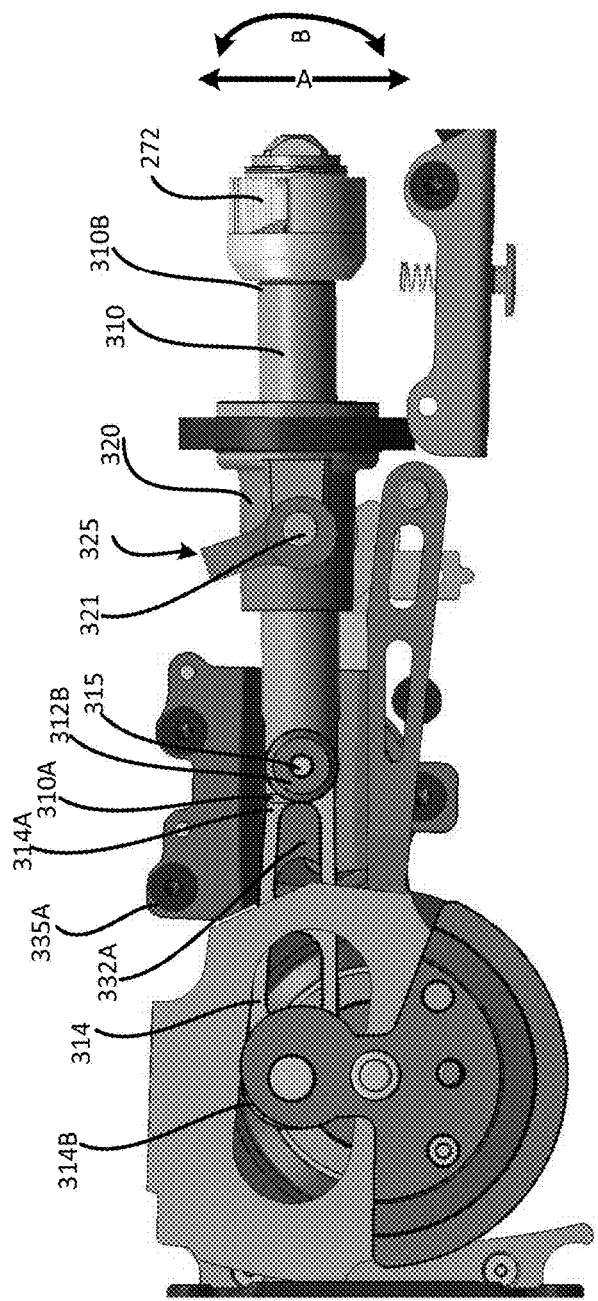
FIG. 3E(1)
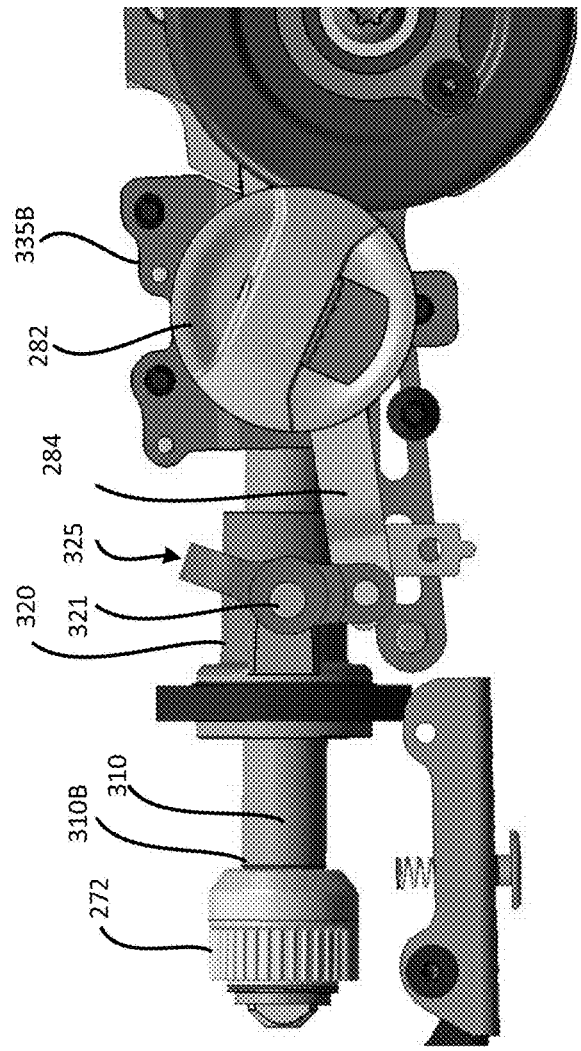
FIG. 3E(2)

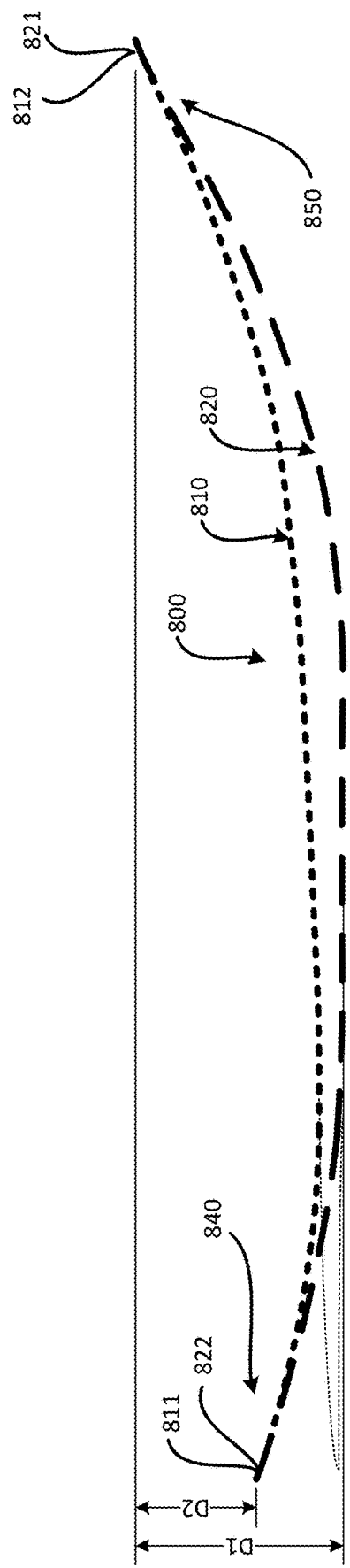

RECIPROCATING TOOL HAVING ORBIT FUNCTION

FIELD

This document relates, generally, to a reciprocating mechanism for a power tool, and in particular to a reciprocating mechanism having a support structure that supports an orbital mode of operation of the reciprocating mechanism.

BACKGROUND

Reciprocating mechanisms may be included in various different types of tools such as, for example, reciprocating saws and jig saws. In these types of tools, reciprocating mechanisms may convert a rotary force or motion to a reciprocating force or motion, for output by the tool. In some examples, the tool may include an orbital mode of operation in which the reciprocating force, or reciprocating motion, follows an orbital path. The reciprocating mechanism may convert the rotational force, or rotational motion, output by the motor to a reciprocating force, or a reciprocating motion, to in turn drive reciprocal motion of an output spindle of the tool. In some situations, cutting performance may be affected by, for example, a reciprocating speed/frequency, a degree of orbit of the cutting path, and other such factors, that may cause inconsistent contact between an accessory tool attached to the output spindle and a workpiece. In some situations, loss of engagement and/or re-engagement between the accessory tool and the workpiece may generate a force that can be transmitted to the user via the tool, thus increasing user fatigue due to increased vibration during operation.

SUMMARY

In one aspect, a reciprocating power tool includes a housing; a driving system including a motor and a transmission received in the housing; and a reciprocating mechanism received in the housing. The reciprocating mechanism may include a guide bracket fixed in the housing; a bushing movably coupled in the housing; and a reciprocating shaft having a first end portion thereof movably coupled to the guide bracket, a second end portion thereof configured to be coupled to an accessory tool, and an intermediate portion thereof movably coupled in the bushing, wherein the reciprocating shaft is configured to reciprocate in response to a force transmitted thereto from the driving system. The guide bracket may include at least one guide slot; a contoured guide surface defined in the at least one guide slot and configured to guide a reciprocating movement of the first end portion of the reciprocating shaft in the guide bracket. The first end portion of the reciprocating shaft may move in a first direction with respect to a longitudinal centerline of the at least one guide slot in response to movement of the first end portion of the reciprocating shaft along the contoured guide surface in a first direction, and the second end portion of the reciprocating shaft may move in a second direction in response to movement of the first end portion of the reciprocating shaft in the first direction, the second direction being opposite the first direction.

In some implementations, the reciprocating power tool also includes at least one roller rotatably coupled to the first end portion of the reciprocating shaft and configured to be received in the at least one guide slot and to roll along the contoured guide surface of the at least one guide slot. The at least one guide slot may include a first guide slot having a first contoured guide surface; and a second guide slot positioned opposite the first guide slot, the second guide slot having a second contoured guide surface. The reciprocating mechanism may include a first roller rotatably coupled to a first side of the first end portion of the reciprocating shaft and configured to be received in the first guide slot and to roll along the first contoured guide surface as the reciprocating shaft reciprocates; and a second roller rotatably coupled to a second side of the first end portion of the reciprocating shaft and configured to be received in the second guide slot and to roll along the second contoured guide surface as the reciprocating shaft reciprocates. A contour of the first contoured guide surface may correspond to a contour of the second contoured guide surface.

In some implementations, the contoured guide surface of the at least one guide slot includes a base portion; a ramped portion; and a transition portion extending between the base portion and the ramped portion. The ramped portion may be oriented at an angle with respect to the base portion. The ramped portion may be oriented away from the longitudinal centerline of the at least one guide slot. The transition portion may have a curved contour defining a curved transition between the base portion and the ramped portion of the contoured guide surface. In some implementations, the contoured guide surface has a curved contour that extends from a first end portion to a second end portion of the at least one guide slot.

In some implementations, during an out stroke of the reciprocating mechanism, the first end portion of the reciprocating shaft is configured to move in the first direction toward the longitudinal centerline of the at least one guide slot from a first side of the at least one guide slot in response to movement of at least one roller coupled to the first end portion of the reciprocating shaft in a first longitudinal direction along contoured portion of the contoured guide surface of the at least one guide slot; and the second end portion of the reciprocating shaft is configured to move in the second direction toward the longitudinal centerline of the at least one guide slot from a second side of the at least one guide slot in response to the movement in the first longitudinal direction of the at least one roller along the contoured portion of the contoured guide surface of the at least one guide slot.

In some implementations, during a return stroke of the reciprocating mechanism, the first end portion of the reciprocating shaft is configured to move in the second direction away from the longitudinal centerline of the at least one guide slot from the first side of the at least one guide slot in response to movement of the at least one roller in a second longitudinal direction along the contoured portion of the contoured guide surface of the at least one guide slot; and the second end portion of the reciprocating shaft is configured to move in the first direction away from the longitudinal centerline of the at least one guide slot from the second side of the at least one guide slot in response to the movement of the at least one roller in the second longitudinal direction along the contoured portion of the contoured guide surface of the at least one guide slot.

In some implementations, the first direction is substantially orthogonal to the longitudinal centerline of the at least one guide slot, and the second direction is substantially orthogonal to the longitudinal centerline of the at least one guide slot.

In some implementations, the reciprocating power tool includes a selection mechanism configured to provide for selection of an operation mode of a plurality of operating modes of the reciprocating tool. The plurality of operation modes may include a linear mode of operation in which a reciprocating motion of the reciprocating shaft follows a linear path; and at least one orbital mode of operation in which the reciprocating motion of the reciprocating shaft follows an orbital path.

The details of one or more implementations are set forth in the accompanying drawings and the description below. Other features will be apparent from the description and drawings, and from the claims.

BRIEF DESCRIPTION OF THE DRAWINGS

FIG. 3D(1) is a first side view, and FIG. 3D(2) is a second side view of the example reciprocating mechanism in a linear mode of operation.

FIG. 3E(1) is a first side view, and FIG. 3E(2) is a second side view of the example reciprocating mechanism in an orbital mode of operation.

FIG. 8 is a schematic diagram of an example cutting path of an example reciprocating power tool including the example guide bracket shown in FIG. 7.

DETAILED DESCRIPTION

Figure 1:
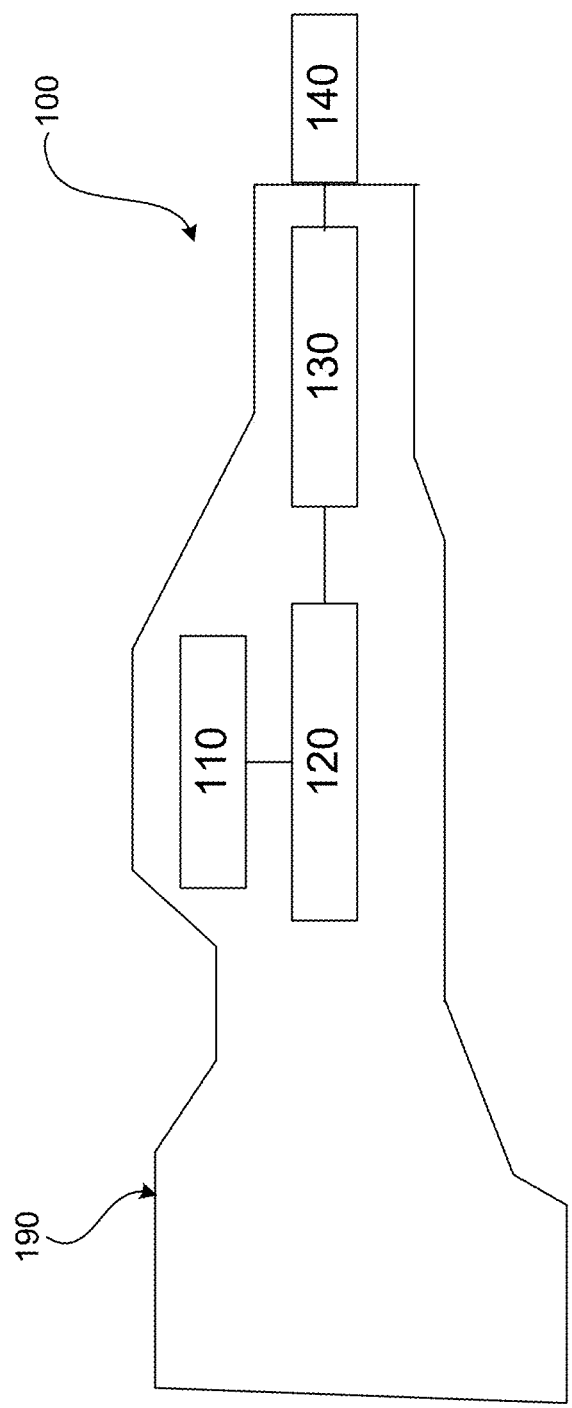
FIG. 1 is a schematic view of an example reciprocating power tool.

A schematic view of an example power tool 100 including a reciprocating mechanism is shown in FIG. 1. The example tool 100 includes a driving system including, for example a driving mechanism 110 and a transmission mechanism 120. The driving mechanism 110 includes, for example, a motor generating a rotational driving force. The transmission mechanism 120 is coupled between the driving mechanism 110 and a reciprocating mechanism 130. The transmission mechanism 120 transfers the driving force generated by the driving mechanism 110 to the reciprocating mechanism 130. In an arrangement in which the driving force generated by the driving mechanism 110 is a rotational force, or a rotational motion, the rotational motion produced by the driving mechanism 110 may be converted into a reciprocating force, or reciprocating motion to be output by an output accessory 140 such as, for example, a blade coupled to the reciprocating mechanism 130. In some examples, the tool 100 may be operable in a linear mode of operation, in which the reciprocating motion is a linear reciprocating motion. The tool 100 may be operable in an orbital mode of operation, in which the reciprocating motion is an orbital reciprocating motion. The driving mechanism 110, the transmission mechanism 120, and the reciprocating mechanism 130 may be received in and/or coupled to a housing 190. The output accessory 140 (such as, for example, a blade) coupled to the reciprocating mechanism 130 may extend from the housing 190, to interact with a workpiece (not shown in FIG. 1). In some implementations, the driving mechanism 110 may be an electric motor that receives power from, for example, a power storage device (such as, for example, a battery), an external electrical power source, and the like. In some implementations, the driving mechanism 110 may be an air driven, or pneumatic motor, that is powered by compressed air introduced into the housing 190 from an external compressed air source. Other types of driving mechanisms, and other sources of power, may provide for power driven operation of the tool 100.

In a power tool that makes use of reciprocal motion, an orbital reciprocating motion of the output accessory coupled to the reciprocating mechanism may improve cutting performance of the tool. For example, orbital reciprocating motion of the output accessory may provide for faster, more efficient cutting through material, and may facilitate chip removal from the cutting path of the output accessory. This may render the tool more useful in certain applications, may reduce operation time to complete a particular task, and may reduce user fatigue during operation. In some situations, cutting performance of the power tool making use of the orbital reciprocating motion of the output accessory may be affected by, for example, a reciprocating speed/frequency, a degree of orbit of the cutting path, and other such factors. In particular, as reciprocating speed/frequency increases and/or a degree of orbit of the reciprocating motion increases, an accessory tool (such as, for example, a blade) may lose contact with the workpiece during certain parts of the reciprocating stroke, engagement between the accessory tool and the workpiece may be delayed on an outstroke portion of the reciprocating stroke, and the like, thus adversely impacting cutting performance of the tool. Additionally, inconsistent engagement between the accessory tool and the workpiece and/or the disengagement and re-engagement therebetween, may generate rebound or kickback forces that are transmitted to the user. These forces may affect the ability of the user to precisely control the tool, and may contribute to user fatigue during operation of the tool.

A reciprocating power tool, in accordance with implementations described herein, may include support structure that guides the orbital reciprocating motion of the reciprocating mechanism. In some implementations, the support structure may guide the reciprocating motion in an orbital path that maintains coordination of the timing of a motion of the accessory tool downward into the workpiece with the stroke of the reciprocating mechanism. This may provide for consistently effective cutting performance, and may reduce rebound forces experienced by the user, thus overall utility and functionality of the power tool.

Figure 2:
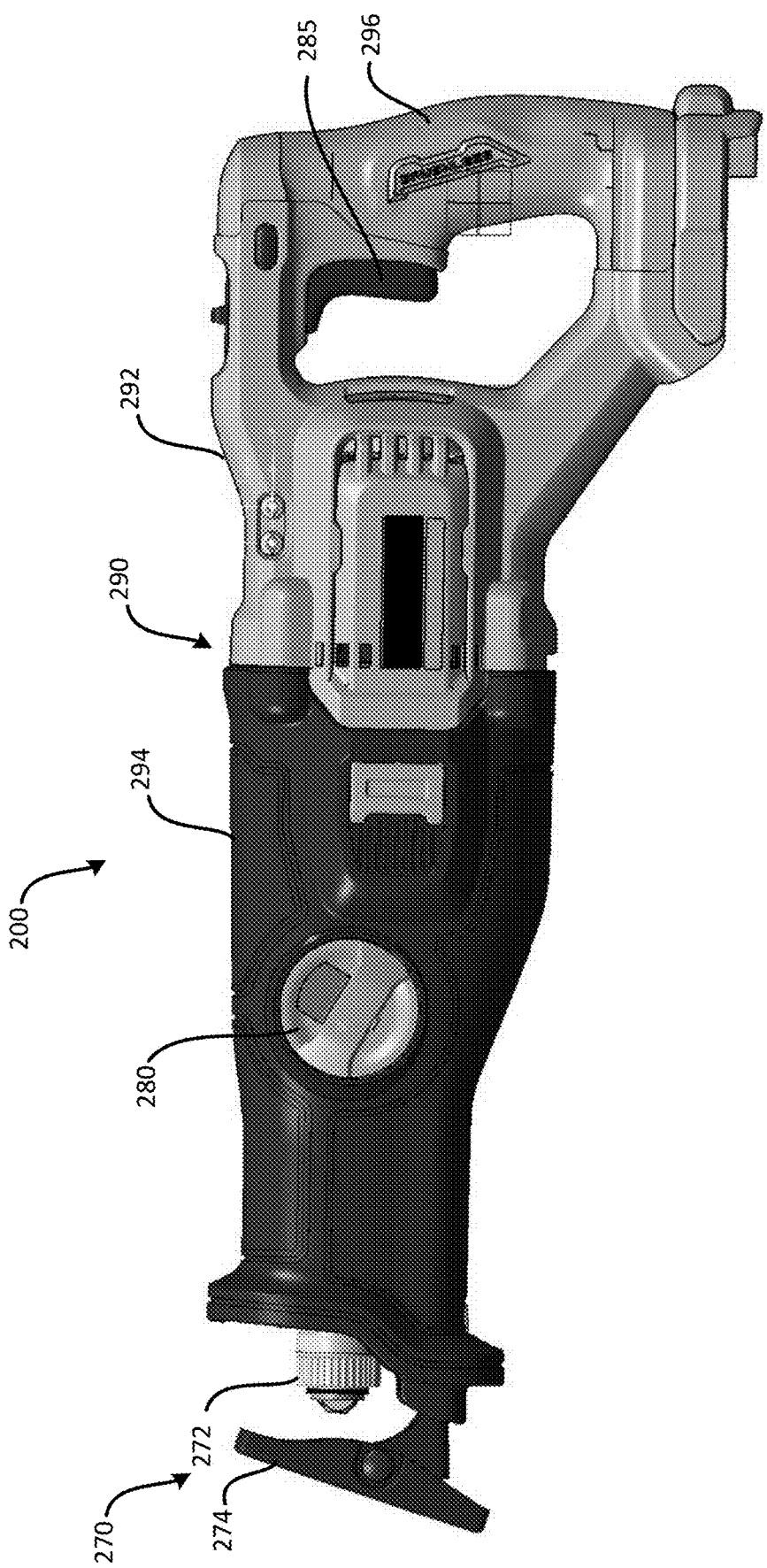
FIG. 2 is a side view of an example reciprocating power tool.

FIG. 2 is a side view of an example reciprocating power tool 200. The example power tool 200 shown in FIG. 2 is a reciprocating saw, simply for purposes of discussion and illustration. The principles to be described herein may be applied to other types of power tools that implement reciprocating motion (such as, for example, jig saws, scroll saws, oscillating tools, and the like).

The example tool 200 may include a housing 290 in which components of the tool 200 are received. In the example shown in FIG. 2, the housing 290 includes a motor housing 292 in which components of a driving system, such as a motor, are received, and an output housing 294 in which output components of the tool 200 are received. One or more selection devices 280 provide for user control of the operation of the power tool 200 such as, for example, an operation mode of the tool 200. An accessory tool coupling device 270 provides for coupling of an accessory tool such as, for example, a blade (not shown in FIG. 2) to the example tool 200. In the example shown in FIG. 2, the accessory tool coupling device 270 includes a tool holder (sometimes also referred to as a clamp) 272, provided at a distal end portion of a reciprocating shaft of a reciprocating mechanism housed in the output housing 294. A cleat 274 may be selectively coupled to the output housing 294 and arranged proximate the tool holder 272 to guide a position of the tool 200 relative to a workpiece and maintain alignment of an accessory tool coupled in the tool holder 272 relative to the workpiece. A trigger 285 provided on a handle portion 296 of the housing 290 may be selectively manipulated by the user for operation of the tool 200.

Figure 3A:
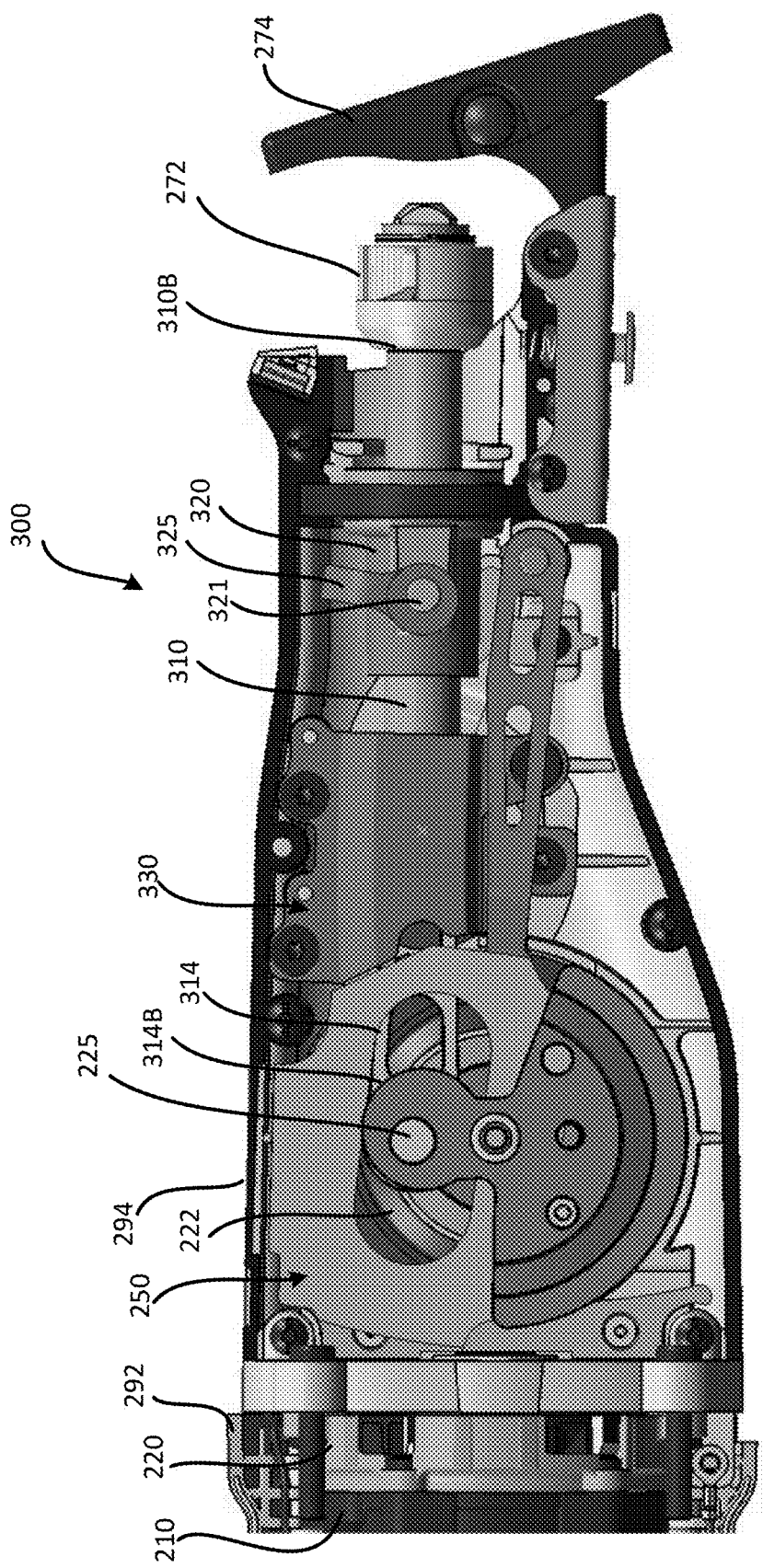
FIG. 3A is a side view of an example reciprocating mechanism, in accordance with implementations described herein.
Figure 3B:
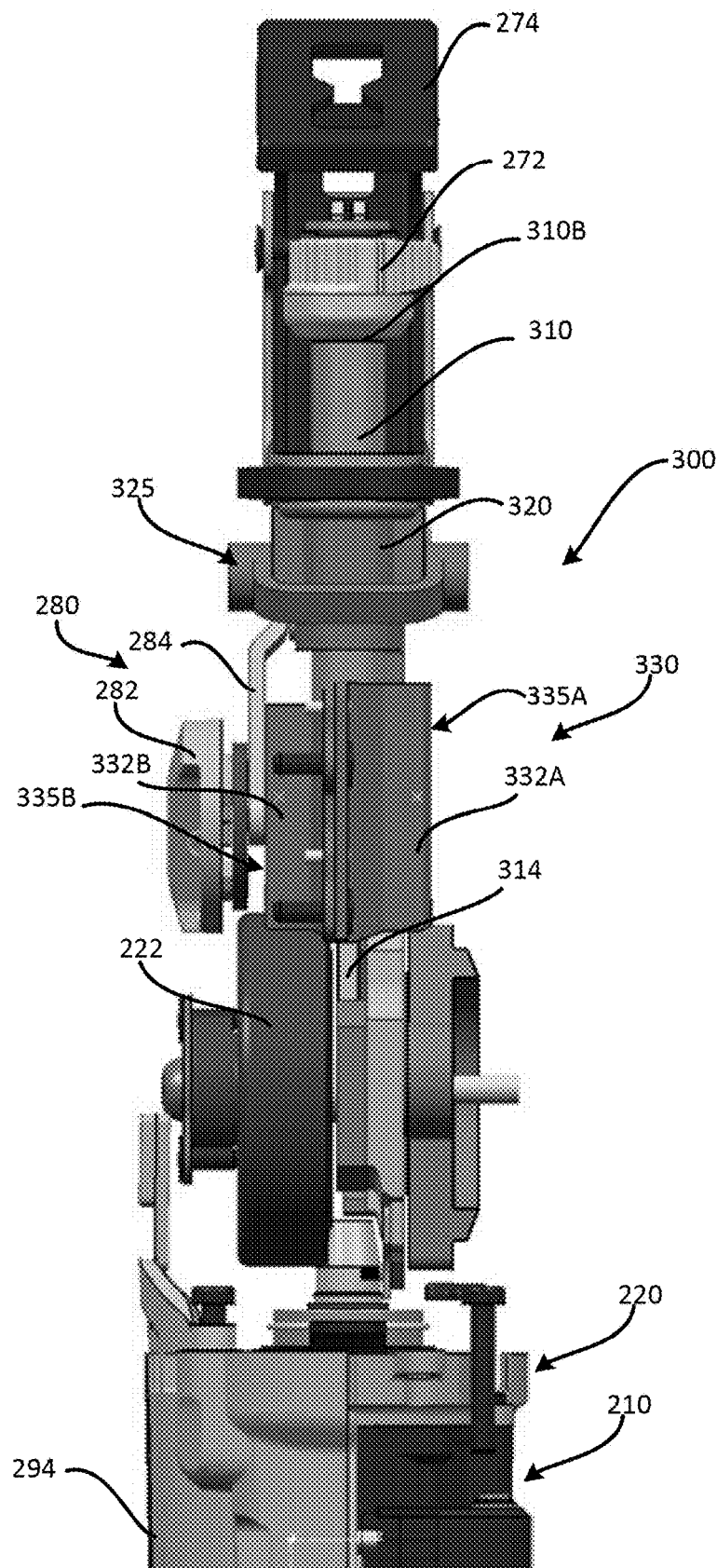
FIG. 3B is a top view of the example reciprocating mechanism shown in FIG. 3A.
Figure 3C:
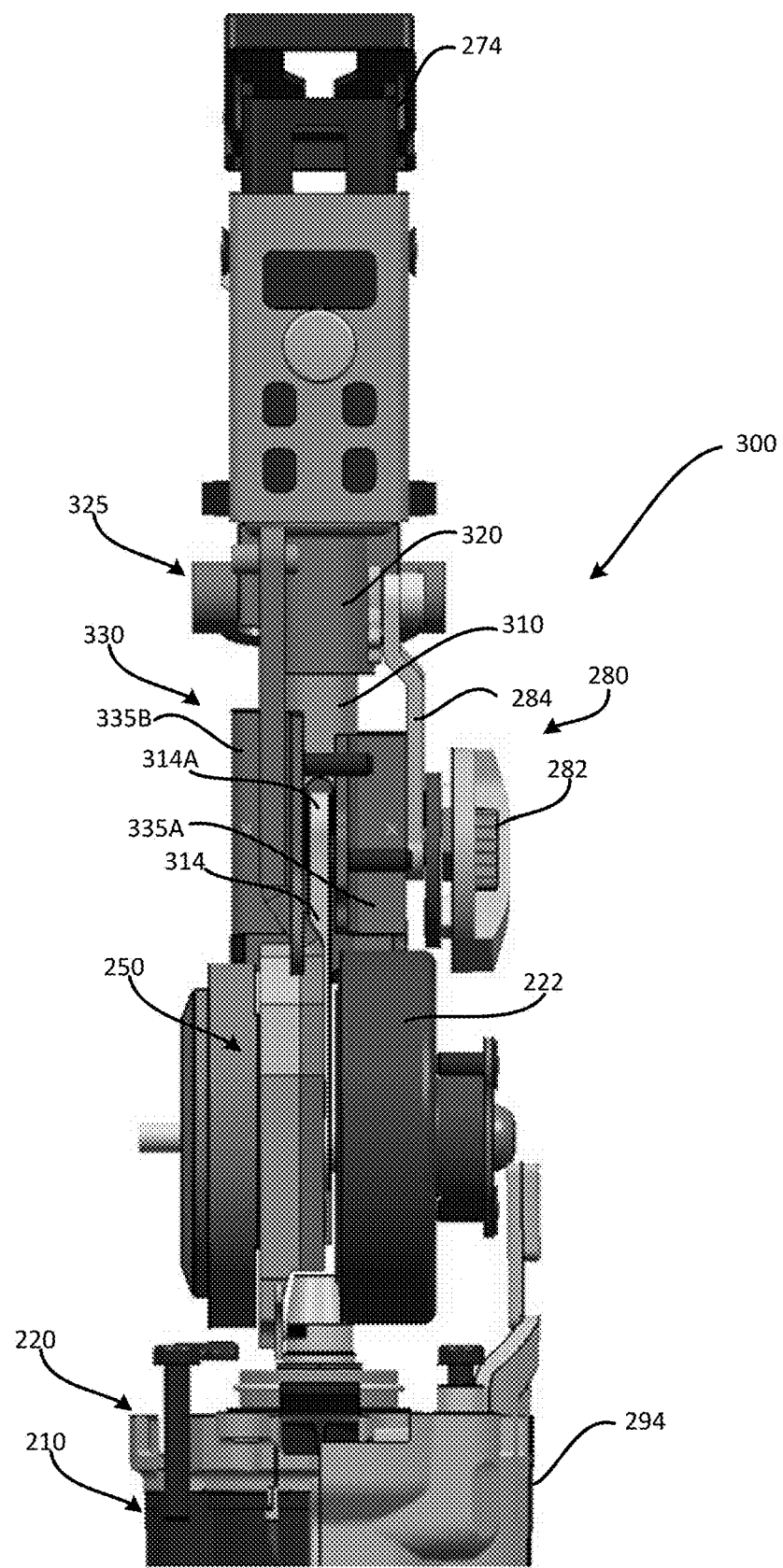
FIG. 3C is a bottom view of the example reciprocating mechanism shown in FIG. 3A.
Figure 3F:
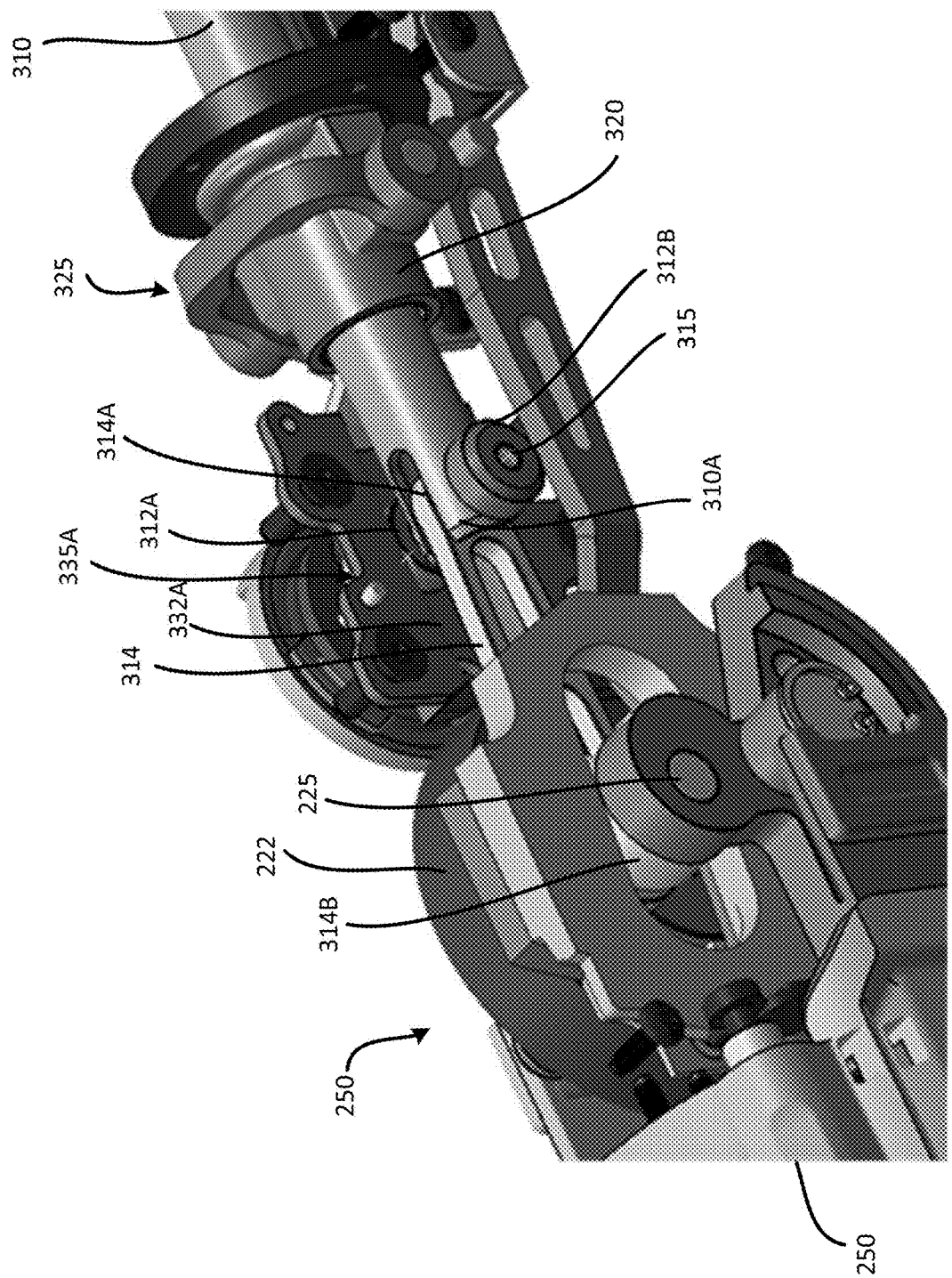
FIG. 3F is a perspective view of the example reciprocating mechanism shown in FIG. 3A.

FIG. 3A is a side view of the example tool 200 shown in FIG. 2, with a portion of the housing 290 removed so that internal components of the tool 200 are visible. FIG. 3B is a top view, and FIG. 3C is a bottom view of the example tool 200 shown in FIG. 2, with the housing 290 removed so that components of an example reciprocating mechanism 300 of the example tool 200 are visible. FIGS. 3D(1) and 3D(2) include first and second side views of the example reciprocating mechanism 300 in a linear mode of operation, and FIGS. 3E(1) and 3E(2) include first and second side views of the example reciprocating mechanism 300 in an orbital mode of operation. FIG. 3F is a top perspective view of the example tool 200 shown in FIG. 2, with the housing 290 and portions of an example guide bracket 330 removed so that remaining components of the example reciprocating mechanism 300 of the example tool 200 are visible.

As shown in FIGS. 3A-3F, a driving mechanism including, for example, a motor 210 and a transmission mechanism 220, and a reciprocating mechanism 300 may be received in the housing 290 of the tool 200. The transmission mechanism 220 may convert a driving force, for example, a rotational force, generated by the driving mechanism, to a reciprocating linear force to be output by the reciprocating mechanism 300. In some implementations, a counterweighting mechanism 250 may be coupled to the reciprocating mechanism 300 to counteract imbalances generated by the driving mechanism (i.e., the motor 210 and the transmission mechanism 220) and the reciprocating mechanism, 300 during operation of the tool 200.

The example reciprocating mechanism 300 shown in FIGS. 3A-3F includes a reciprocating shaft 310 having a first end portion 310A coupled to and cooperating with a guide bracket 330. The guide bracket 330 is, in turn, coupled to a corresponding portion of the housing 290. The tool holder 272 is coupled to a second end portion 310B of the reciprocating shaft 310. An intermediate portion of the output shaft 310 is slidably received in an orbit bushing 320. A yoke 314 has a first end portion 314A coupled to the first end portion 310A of the reciprocating shaft 310, and a second end portion 314B coupled to an output gear 222 of the transmission mechanism 220, the output gear 222 of the transmission mechanism 220 being coupled to and driven by an output shaft/output gear of the motor 210 (not explicitly shown in FIGS. 3A-3F). For example, the second end portion 314B of the yoke 314 may be coupled to a pin 225 coupled to the output gear 222. The pin 225 may be eccentrically positioned relative to a center of rotation of the output gear 222. Rotation of the output gear 222 causes reciprocal motion of the second end portion 314B of the yoke 314 coupled to the pin 225, in turn causing reciprocal motion of the reciprocating shaft 310 coupled to the first end portion 314A of the yoke 314.

In some examples, an orbit bracket 325 provides for the coupling of the selection device 280 to the orbit bushing 320. As shown in FIGS. 3B and 3C, the selection device 280 may include a selection knob 282 coupled to an arm 284, with the arm 284 in turn coupled to the orbit bracket 325 via a coupling pin 321. When coupled in this manner, a position of the orbit bracket 325 may be moved in response to manipulation of the selection device 280, for example movement of the selection knob 282, causing a corresponding change in position of the orbit bushing 320 and a corresponding change in orientation of the reciprocating shaft 310.

In some examples, the guide bracket 330 may be coupled, for example, fixedly coupled to a portion of the tool 200, such as the housing 290, so that the guide bracket 330 is fixed, and remains stationary within the housing 290. In the example shown in FIGS. 3A-3F, the guide bracket 330 includes a first bracket 335A and a second bracket 335B coupled to the first bracket 335A. The first end portion 310A of the reciprocating shaft 310 is received in a space formed between the first and second brackets 335A, 335B. In the views shown in FIGS. 3D-3F, the second bracket 335B is removed, so that interaction between the first end portion 310A of the reciprocating shaft 310, the first end portion 314A of the yoke 314, and the interior facing side of the guide bracket 330 is visible.

As shown in FIGS. 3D-3F, rollers 312 are mounted on a shaft 315 extending through the first end portion 310A of the reciprocating shaft 310. The rollers 312 include a first roller 312A positioned on a first side of the first end portion 310A of the reciprocating shaft 310, that is movably received in a first guide slot 332A formed in the first bracket 335A of the guide bracket 330. The rollers 312 include a second roller 312B positioned on a second side of the first end portion 310A of the reciprocating shaft 310, that is movably received in a second guide slot 332B formed in the second bracket 335B of the guide bracket 330. Interaction of the first roller 312A in the first guide slot 332A of the first bracket 335A and the second roller 312B in the second guide slot 332B of the second bracket 335B guides the reciprocating motion of the reciprocating shaft 310.

In the example views provided in FIGS. 3D-3F, only one bracket 335 (i.e., one of the first bracket 335A or the second bracket 335B of the guide bracket 330) is shown, simply for purposes of discussion and illustration. The principles to be described herein may be similarly applied to the interaction of the first roller 312A in the first guide slot 332A of the first bracket 335A, and to the interaction of the first roller 312B in the second guide slot 332B of the second bracket 335B.

In the example arrangement shown in FIGS. 3A-3F, the guide bracket 330 remains fixed relative to the housing 290, and the orbit bushing 320 is movable (for example, vertically movable in the example orientation of the tool 200 shown in FIGS. 3A, 3D and 3E), based on a mode of operation of the tool 200 selected through manipulation of the selection device 280 and corresponding movement of the orbit bracket 325 and orbit bushing 320. FIGS. 3D(1) is a first side view and FIG. 3D(2) is a second side view of a position and/or orientation of the components of the reciprocating mechanism 300 in a linear mode of operation of the example tool 200. FIGS. 3E(1) is a first side view and FIG. 3E(2) is a second side view of a position and/or orientation of the components of the reciprocating mechanism 300 in an orbital mode of operation of the example tool 200. That is, a position of the orbit bushing 320 may change in response to manipulation of the selection device 280 and movement of the pin 321 (for example, in the direction of the arrow A), causing a corresponding change in orientation of orbit bushing 320 and the reciprocating shaft 310 slidably received therein (for example, as the bushing 320 rotates about the pin 321 in the direction of the arrow B). That is, the selection knob 282 may be rotated to select a particular mode of operation, causing the arm 284 coupled thereto to move in a corresponding direction. The movement of the selection arm 284, which is also coupled to the orbit bracket 325 at a coupling pin 321, in turn causes corresponding movement of the orbit bushing 320 and a corresponding change in orientation of the shaft 310 slidably received therein. Thus, in this example arrangement, the orbit bracket 325 provides for the coupling of the selection device 280 to the orbit bushing 320. The selection knob 282 is coupled to the arm 284, with the arm 284 in turn coupled to the orbit bracket 325 via the coupling pin 321. When coupled in this manner, a position of the orbit bracket 325 may be moved in response to manipulation of the device mechanism 280, for example movement of the selection knob 282, causing a corresponding change in position of the orbit bushing 320 and a corresponding change in orientation of the reciprocating shaft 310.

Figure 4A:
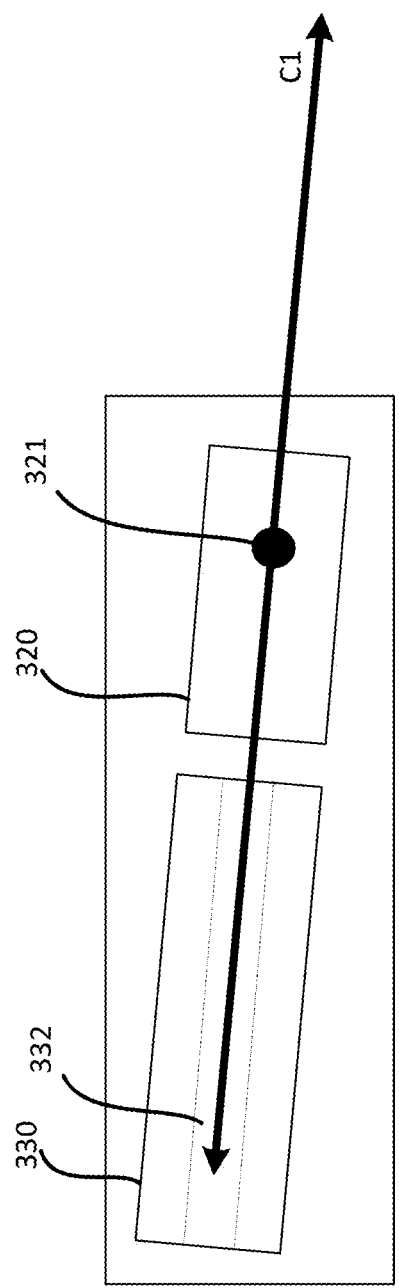
FIG. 4A is a schematic illustration of operation of the example reciprocating mechanism in a linear mode of operation.
Figure 4B:
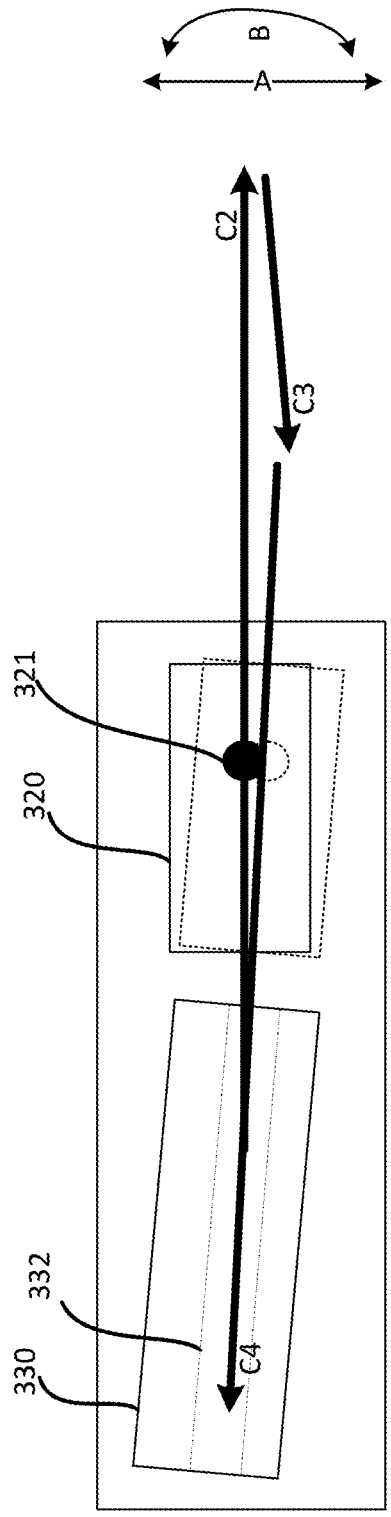
FIG. 4B is a schematic illustration of operation of the example reciprocating mechanism in an orbital mode of operation.

FIG. 4A is a schematic illustration of the relative arrangement of the guide bracket 330 and the orbit bushing 320 in the linear operation mode. FIG. 4B is a schematic illustration of the relative arrangement of the guide bracket 330 and the orbit bushing 320 in the orbital operation mode. In the schematic illustration of transition between these two modes of operation, the guide bracket 330 remains fixed and a position and/or orientation of the orbit bushing 320 (and the reciprocating shaft 310 slidably received therein) relative to the guide bracket 330 is changed as the coupling pin 321 is moved in the direction of the arrow A in response to manipulation of the selection device 280. An orientation of the orbit bushing 320 is changed, for example, the orbit bushing 320 rotates about the coupling pin 321. That is, the coupling pin 321 is moved upward (in the orientation illustrated in FIGS. 4A and 4B) in response to manipulation of the selection device 280, to transition from the linear mode to the orbital mode of operation. This upward movement of the coupling pin 321 and the orbit bushing 320 coupled thereto causes the reciprocating shaft 310 to rotate about the first end portion 310A of the reciprocating shaft 310, and a corresponding shift in orientation of the reciprocating shaft 310 and the orbit bushing 320 in which it is slidably received. As the reciprocating shaft 310 reciprocates in the orbital mode, the orbit bushing 320 rotates about the coupling pin 321 to accommodate the change in orientation of the reciprocating shaft 310 relative to the guide bracket 330.

During operation in the linear mode, the bushing 320 is in a first position shown in FIG. 4A, in which the orbit bushing 320 is substantially aligned with the guide bracket 330. In this position, the orbit bushing 320 is substantially linearly aligned with the guide slots 332 of the guide bracket 330. This arrangement provides for a substantially linear movement of the reciprocating shaft 310 (and an accessory tool such as a blade coupled thereto), along the path shown by the arrow C1.

During operation in the orbital mode, the coupling pin 321 has shifted upward (in the example orientation shown in FIGS. 4A and 4B), to a second position from the first position (shown in shadow in FIG. 4B). In the second position shown in FIG. 4B, the orbit busing 320 has moved upward with the coupling pin 321, and has also rotated about the coupling pin 321. The first end portion 310A of the reciprocating shaft 310 remains pivotably engaged in the guide slots 332A, 332B (via the first and second rollers 312A, 312B), allowing the orientation of the reciprocating shaft 310 to change as the coupling pin 321/orbit bushing 320 move upward. In the arrangement shown in FIG. 4B, the reciprocating shaft 310 is slidably received in the bushing 320 (and an accessory tool such as a blade coupled thereto) follows a path as shown by the arrow C2 on an out stroke, and follows a path as shown by the arrows C3 and C4 on a return stroke. The slightly downward inclination of the arrow C3 and slightly upward inclination of the arrow C4 is enabled by the rotation of the orbit bushing 320 about the coupling pin 321, with the first end portion of the reciprocating shaft 310 moving in the guide slot 332 and the reciprocating shaft 310 being slidably received in the orbit bushing 320 as it moves through the stroke. Thus, the slightly downward inclination of the arrow C3 and the slightly upward inclination of the arrow C4 schematically illustrates the orbital reciprocating motion of the reciprocating shaft 310 (and an accessory tool such as a blade coupled thereto) generated due to the position and orientation of the orbit bushing 320 relative to the guide bracket 330 shown in FIG. 4B, the interaction between the rollers 312A, 312B at the first end portion of the reciprocating shaft 310 and the respective guide slots 332 formed in the guide bracket 330, and the rotation of the orbit bushing 320 about the coupling pin 321, when arranged in this manner. FIG. 4B schematically illustrates one example reciprocating orbital path that may be achieved by arrangement of the orbit bushing 320 relative to the guide bracket 330 in this manner. Other reciprocating orbital paths may be achieved by altering the position and/or orientation of the orbit bushing 320 relative to the fixed guide bracket 330.

Figure 5:
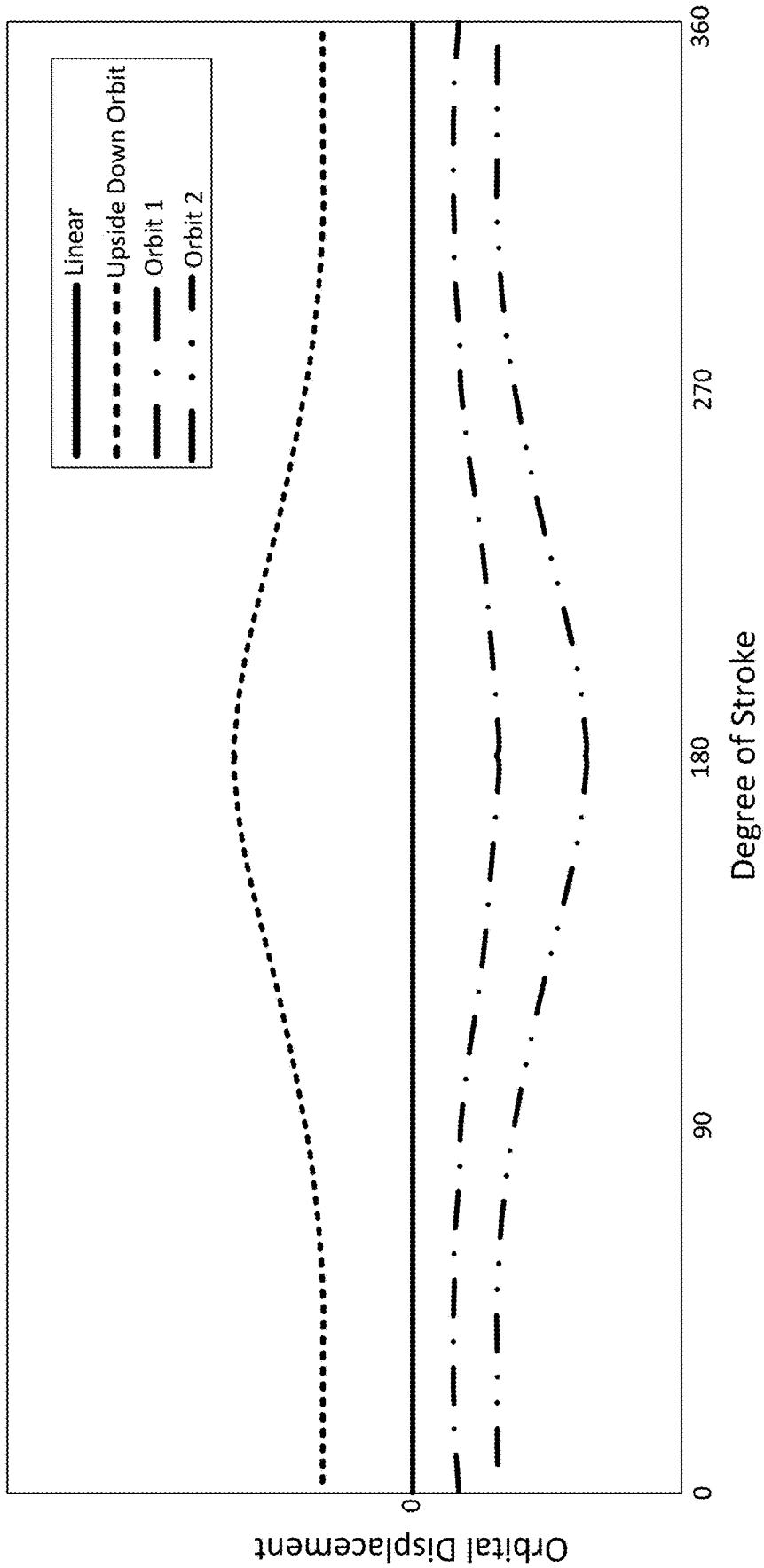
FIG. 5 is a graph illustrating orbit patterns for different degrees of orbital reciprocating motion of the example reciprocating tool.

As noted above, a change in the position and/or orientation of the orbit bushing 320 in the direction of the arrow A and/or the arrow B (see FIGS. 3D, 3E, 4A and 4B) may change the degree of orbital motion incorporated into the reciprocal motion of the reciprocating shaft 310 (and an accessory tool such as a blade coupled thereto). The graph shown in FIG. 5 illustrates full reciprocating strokes for varying amounts of orbit in the reciprocating motion, as a function of displacement from the linear mode of operation, as the output gear 222 rotates through 360 degrees to complete a full stroke of the reciprocating shaft 310.

As described above, cutting performance of a reciprocating tool may be adversely affected by various factors including, for example, reciprocating speed and/or reciprocating frequency of the reciprocating mechanism, a degree of orbital motion of the reciprocating mechanism and resulting cutting path during operation, and other such factors. Particularly at relatively higher reciprocating speeds of the reciprocating mechanism, contact between an accessory tool attached to the reciprocating mechanism and a workpiece may become inconsistent. This inconsistent contact and/or disengagement/re-engagement between the accessory tool and the workpiece may be exacerbated at relatively greater degrees of orbit in the reciprocating motion of the reciprocating mechanism/accessory tool. The inconsistent contact and/or disengagement/re-engagement between the accessory tool and the workpiece can adversely impact cutting performance of the tool, and can generate rebound forces that are transmitted to the user, thus affecting cutting precision and user fatigue.

Figure 6:
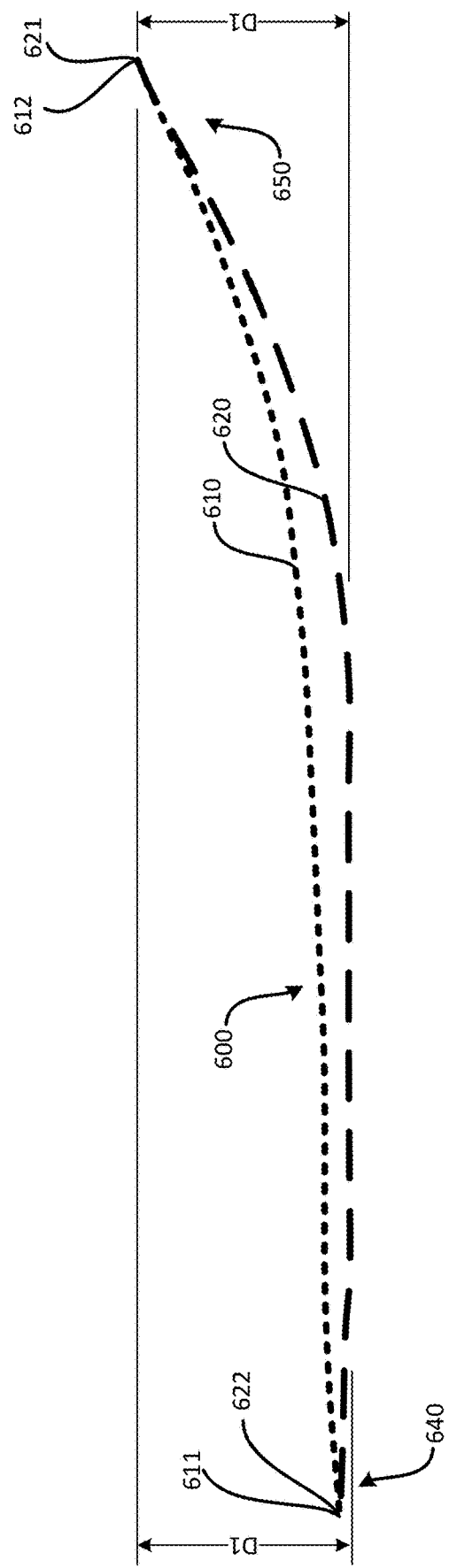
FIG. 6 is a schematic diagram of an example cutting path of a reciprocating power tool.

In the orbital mode of operation of the example tool 200, an accessory tool (such as a blade) coupled to the second end portion of the reciprocating shaft 310 by the tool holder 272 may follow a cutting path corresponding to the orbital motion of the reciprocating shaft 310 to which is it attached. A schematic diagram of an example cutting path 600 that may be followed by a tool in an orbital mode of operation is shown in FIG. 6. The example cutting path 600 shown in FIG. 6 is produced by a power tool in which the guides slots 332 of the guide bracket 330 of the reciprocating mechanism 300 include a relatively straight guide surface guiding reciprocating movement of the rollers 312 in the guide slots 332. FIG. 8 is a schematic diagram of an example cutting path 800 produced by the example power tool 200 including the example reciprocating mechanism 300 as described above. The example cutting path 800 shown in FIG. 8 is produced by a tool in which the guide slots 332 of the guide bracket 330 of the reciprocating mechanism 300 include a contoured guide surface guiding reciprocating movement of the rollers 312 and first end portion 310A of the reciprocating shaft 310 in the guide slots 332, as shown in FIG. 7.

The example cutting path 600 shown in FIG. 6 includes a first portion 610 initiating at a first end portion 611 and terminating at a second end portion 612, representing an out stroke of the cutting path 600. The example cutting path 600 includes a second portion 620 initiating at a first end portion 621 and terminating at a second end portion 622 representing a return stroke of the cutting path 600. In this arrangement, an initial stroke may engage the workpiece and initiate the cutting path 600 in the workpiece. However, due to the orientation of the accessory tool relative to the workpiece as the reciprocating mechanism 300 carries out subsequent strokes, particularly at relatively high reciprocating speeds and/or at relatively high degrees of orbital motion, the accessory tool may disengage or lose contact with the workpiece. This disengagement may occur in a return region 650 of the cutting path 600, representing a portion of the stroke at which the accessory tool is completing the out stroke and initiating the return stroke. That is, in the arrangement shown in FIG. 6 (in a configuration in which the guide slots 332 of the guide bracket 330 are substantially straight), the accessory tool covers a distance D1 as the reciprocating motion changes direction at a transition region 640 to initiate a subsequent stroke for a given amount of orbit in the reciprocating motion. That is, a distance (for example, a vertical distance in the example orientation shown in FIG. 6) between a position of the accessory tool at the first end portion 611 of the first portion 610 of the cutting path 600 and the position of the accessory tool at the second end portion 612 of the first portion 610 of the cutting path 600 is represented by the distance D1 shown in FIG. 6. Similarly, the distance between a position of the accessory tool at the first end portion 621 of the second portion 620 of the cutting path 600 and the position of the accessory tool at the second end portion 622 of the second portion 620 of the cutting path 600 is represented by the distance D1 shown in FIG. 6. In the schematic diagram shown in FIG. 6, the distance D1 traveled by the accessory tool may be representative of a degree of orbit produced by the reciprocating mechanism 300 and output at the accessory tool coupled thereto.

In contrast, in a power tool including a reciprocating mechanism, in accordance with implementations described herein, the guide slots 332A, 332B of the guide bracket 330 may be contoured (rather than straight, as the example described above with respect to FIG. 6). FIG. 7 is a perspective view of the example guide bracket 330 of the example reciprocating mechanism 300 described above with respect to FIGS. 3A-3F. The example guide slots 332A, 332B of the first/second bracket 335A, 335B of the guide bracket 330 shown in FIG. 7 includes a contoured guide surface 730 that interacts with the respective first and second rollers 312A, 312B to produce the desired degree of orbital reciprocating motion of the reciprocating shaft 310 and accessory coupled thereto, while also reducing or substantially eliminating the disengagement/re-engagement between the accessory tool and the workpiece described above with respect to FIG. 6 for a guide slot having a substantially straight contour.

Figure 7:
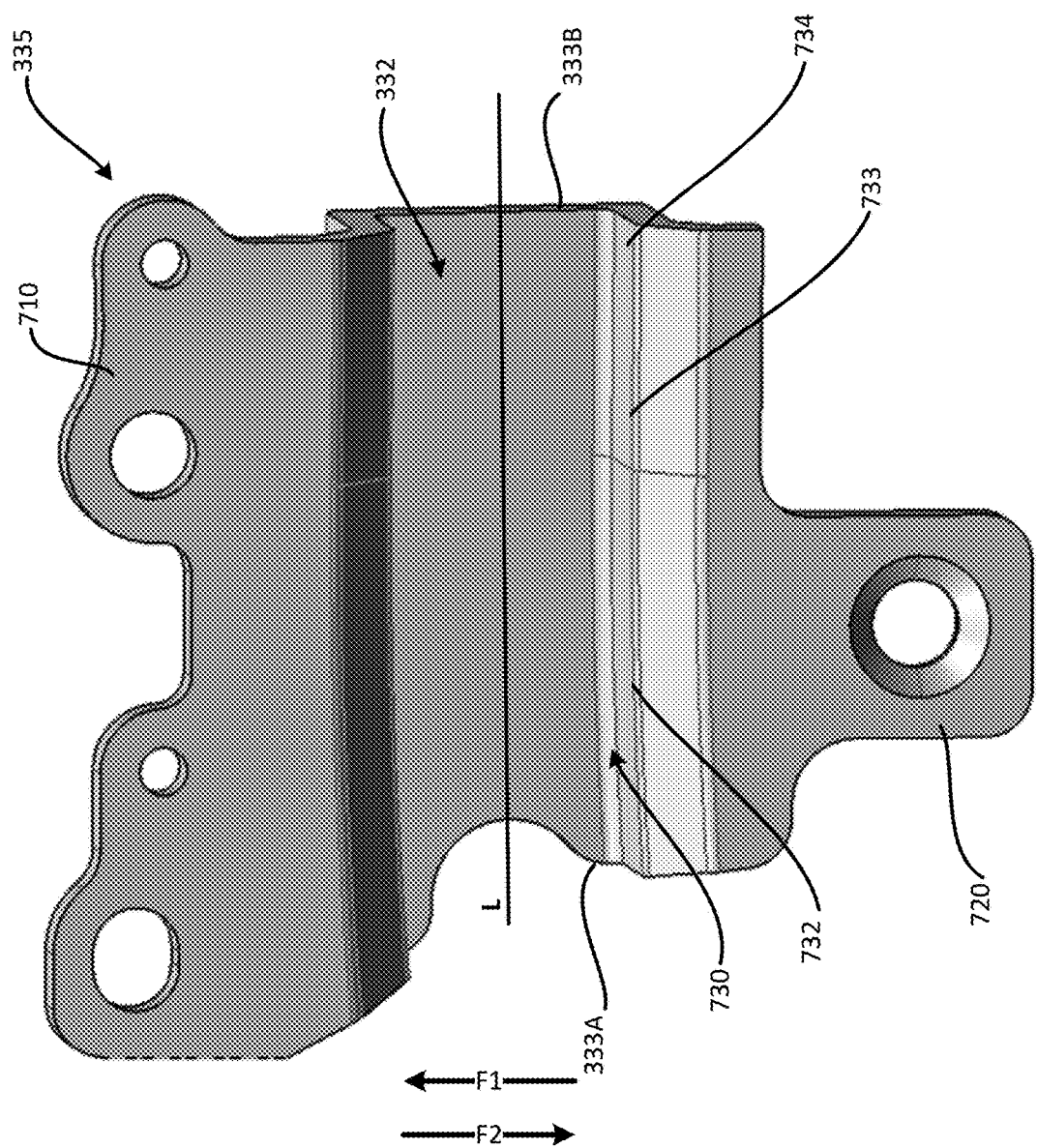
FIG. 7 is a perspective view of an example guide bracket of the example reciprocating mechanism shown in FIGS. 3A-3F.

In the example shown in FIG. 7, only the first bracket 335A is shown, simply for purposes of discussion and illustration. The principles to be described herein with respect to interaction between the rollers 312 (312A, 312B) and the respective guide slots 332 may be similarly applied to interaction of the first roller 312A in the first guide slot 332A of the first bracket 335A of the guide bracket 330, and the second roller 312B in the second guide slot 332B of the second bracket 335B of the guide bracket 330.

As shown in FIG. 7, the first bracket 335A includes a first flange 710 and a second flange 720 providing for coupling of the first bracket 335A and the second bracket 335B (see also, FIGS. 3B and 3C). At least one of the first flange 710 and/or the second flange 720 may provide for the coupling of the guide bracket 330 to the housing 290 of the power tool 200. A recessed area formed between the first flange 710 and the second flange 720 defines the guide slot 332 in the respective bracket 335. The guide slot 332 includes a contoured guide surface 730 that interacts with the roller 312 received in the respective guide slot 332. The roller 312 rolls on the contoured guide surface 730 to guide the reciprocal movement of the roller 312 and the corresponding reciprocating movement of the reciprocating shaft 310. A contour of the contoured guide surface 730 of the first guide slot 332A of the first bracket 335A may correspond to a contour of the contoured guide surface 730 of the second guide slot 332B of the second bracket 335B to provide for coordinated movement of the first end portion 310A of the reciprocating shaft 310 in the guide bracket 330. The contour of the contoured guide surface 730 allows the desired amount of orbital reciprocating motion to be achieved while also reducing or substantially eliminating the issues associated with disengagement and re-engagement of the accessory tool and the workpiece.

As shown in FIG. 7, in some examples, the contoured guide surface 730 may be defined by a curved surface that extends substantially from a first end portion 333A to a second end portion 333B of the guide slot 332. The contour of the curved surface defining the contoured guide surface may cause the rollers 312 and first end portion 310A of the reciprocating shaft 310 to move in the direction of the arrow F1 (for example, upward with respect to the longitudinal centerline L of the guide slot 332) as the rollers 312 roll from the first end portion 333A towards the second end portion 333B of the guide slots 332 during the out stroke of the reciprocating mechanism 300. The contour of the curved surface defining the contoured guide surface 730 may cause the rollers 312 and first end portion 310A of the reciprocating shaft 310 to move in the direction of the arrow F2 (for example, downward with respect to the longitudinal centerline L of the guide slot 332) as the rollers 312 roll from the second end portion 333B towards the first end portion 333A of the guide slots 332 during the return stroke of the reciprocating mechanism 300. Thus, the position of the rollers 312 is displaced, for example, in an orthogonal direction from the longitudinal centerline L of the guide slots 332, as the rollers 312 move along the respective contoured guide surface 730. In some examples, the contoured guide surface 730 is substantially continuously smoothly contoured to produce a corresponding movement of the rollers 312 in the guide slots 332 and a corresponding movement of the reciprocating shaft 310. In some examples, the contoured guide surface 730 may include a contoured portion 732 that extends from a base portion 734 via a transition portion 733 to guide the movement of the rollers 312 in the guide slots 332.

As noted above, during operation of the power tool 200 in the orbital mode of operation, the contour of the contoured guide surface 730 causes the rollers 312 (and the first end portion 310A of the reciprocating shaft 310 to which the rollers 312 are coupled) to move in the direction of the arrow F1 (upward, in the example orientation shown in FIG. 7) during the out stroke of the reciprocating shaft 310. This upward movement of the first end portion 310A of the reciprocating shaft 310 during the out stroke causes a corresponding movement of the second end portion 310B of the reciprocating shaft 310 (and the accessory tool coupled thereto) in the direction of the arrow F2 (downward, in the example orientation shown in FIG. 7) during the out stroke of the reciprocating shaft 310. Similarly, the contour of the ramped portion 732 of the contoured guide surface 730 causes the rollers 312 (and the first end portion 310A of the reciprocating shaft 310 to which the rollers 312 are coupled) to move in the direction of the arrow F2 (downward) during the return stroke of the reciprocating shaft 310. This downward movement of the first end portion 310A of the reciprocating shaft during the return stroke causes a corresponding movement of the second end portion 310B of the reciprocating shaft 310 (and the accessory tool coupled thereto) in the direction of the arrow F1 (upward) during the return stroke of the reciprocating shaft 310.

The example cutting path 800 shown in FIG. 8 may be produced by the reciprocating mechanism 300 including the guide bracket 330 with guide slots 332 having contoured guide surfaces 730 as shown in FIG. 7. The example cutting path 800 shown in FIG. 8 includes a first portion 810 initiating at a first end portion 811 and terminating at a second end portion 812, representing an out stroke of the cutting path 800. The example cutting path 800 includes a second portion 820 initiating at a first end portion 821 and terminating at a second end portion 822 representing a return stroke of the cutting path 800. In the example configuration shown in FIG. 7 producing the example cutting path 800 shown in FIG. 8, an initial stroke (i.e., the out stroke represented by the first portion 810 and the return stroke represented by the second portion 820 of the example cutting path 800) may engage the workpiece and initiate the cutting path 800 in the workpiece. Due to the configuration of the guide slots 332 shown in FIG. 7, an orientation of the accessory tool relative to the workpiece as the reciprocating mechanism 300 carries out subsequent strokes may facilitate more continued engagement between the accessory tool and the workpiece as the reciprocating mechanism 300 carries out subsequent strokes, even at relatively high reciprocating speeds and/or at relatively high degrees of orbital motion. The ability to maintain engagement (and thus reduce or substantially eliminate the disengagement/re-engagement described above with respect to FIG. 6) may improve cutting performance of the tool 200, may improve user control and resulting cutting precision, and may reduce user fatigue during operation.

For example, engagement of the accessory tool and the workpiece may be maintained (or a disengagement period may be significantly reduced) through a return region 850 of the cutting path 800 representing a portion of the cutting path at which the accessory tool is completing the outstroke and initiating the return stroke of the cutting path 800. That is, in the schematic diagram shown in FIG. 8, the accessory tool has covered a distance D1 as it completes the stroke, where the reciprocating motion changes direction at the transition region 640 to initiate a subsequent stroke for a given amount of orbit in the reciprocating motion. In this example, the distance D1 traveled by the accessory tool may be representative of a degree of orbit produced by the reciprocating mechanism 300 and output at the accessory tool coupled thereto (as in the arrangement shown in FIG. 6). However, in this example, the movement of the rollers 312 along the contoured guide surface 730 of the guide slots 332 and the corresponding downward movement of the first end portion 310A cause the upward movement of the second end portion 310B of the reciprocating shaft 310 (and the accessory tool coupled thereto) in the transition region 840 of the cutting path. This upward movement of the second end portion 310B of the reciprocating shaft 310 at this point in cutting path reduces a distance between a point of transition at the transition region 840 and relative to the return region 850 to a distance D2, while still allowing the reciprocating mechanism 300 to travel through the distance D1 and achieve the degree of orbit in the reciprocating motion corresponding to the distance D1. Thus, the contoured guide surface 730 of the guide slots 332 may interact with the respective rollers 312 to produce the desired degree of orbital reciprocating motion of the reciprocating shaft 310 and the accessory tool coupled thereto, while also reducing or substantially eliminating the disengagement/re-engagement between the accessory tool and the workpiece. This may result in improved cutting efficiency and precision, and may reduce user fatigue during operation.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A reciprocating power tool, comprising:
   a housing;
   a driving system including a motor and a transmission received in the housing; and
   a reciprocating mechanism received in the housing, the reciprocating mechanism including:
      a guide bracket fixed in the housing;
      a bushing movably coupled in the housing; and
      a reciprocating shaft having a first end portion thereof movably coupled to the guide bracket, a second end portion thereof configured to be coupled to an accessory tool, and an intermediate portion thereof movably coupled in the bushing, wherein the reciprocating shaft is configured to reciprocate in response to a force transmitted thereto from the driving system,
   wherein the guide bracket includes:
      at least one guide slot;
      a contoured guide surface defined in the at least one guide slot, the contoured guide surface having a curved contour configured to guide a rolling motion of at least one roller coupled to the first end portion of the reciprocating shaft in response to a reciprocating movement of the first end portion of the reciprocating shaft in the guide bracket,
      wherein, in response to the rolling motion of the at least one roller along the contoured guide surface, the first end portion of the reciprocating shaft moves in a first direction with respect to a longitudinal centerline of the at least one guide slot, and the second end portion of the reciprocating shaft moves in a second direction that is opposite the first direction.

2. The reciprocating power tool of claim 1, wherein the at least one guide slot includes:
   a first guide slot having a first contoured guide surface; and
   a second guide slot positioned opposite the first guide slot, the second guide slot having a second contoured guide surface.

3. The reciprocating power tool of claim 2, wherein the at least one roller includes:
   a first roller rotatably coupled to a first side of the first end portion of the reciprocating shaft and configured to be received in the first guide slot and to roll along the first contoured guide surface as the reciprocating shaft reciprocates; and
   a second roller rotatably coupled to a second side of the first end portion of the reciprocating shaft and configured to be received in the second guide slot and to roll along the second contoured guide surface as the reciprocating shaft reciprocates.

4. The reciprocating power tool of claim 2, wherein a contour of the first contoured guide surface corresponds to a contour of the second contoured guide surface.

5. The reciprocating power tool of claim 1, wherein the contoured guide surface of the at least one guide slot includes:
   a base portion;
   a ramped portion; and
   a transition portion extending between the base portion and the ramped portion,
   wherein the ramped portion is oriented at an angle with respect to the base portion.

6. The reciprocating power tool of claim 5, wherein the ramped portion is oriented away from the longitudinal centerline of the at least one guide slot.

7. The reciprocating power tool of claim 5, wherein the transition portion has a curved contour defining a curved transition between the base portion and the ramped portion of the contoured guide surface.

8. The reciprocating power tool of claim 1, wherein the curved contour of the contoured guide surface extends from a first end portion to a second end portion of the at least one guide slot.

9. The reciprocating power tool of claim 1, wherein, during an out stroke of the reciprocating mechanism:
   the first end portion of the reciprocating shaft is configured to move in the first direction toward the longitudinal centerline of the at least one guide slot from a first side of the at least one guide slot in response to movement of the at least one roller coupled to the first end portion of the reciprocating shaft in a first longitudinal direction along contoured portion of the contoured guide surface of the at least one guide slot; and
   the second end portion of the reciprocating shaft is configured to move in the second direction toward the longitudinal centerline of the at least one guide slot from a second side of the at least one guide slot in response to the movement in the first longitudinal direction of the at least one roller along the contoured portion of the contoured guide surface of the at least one guide slot.

10. The reciprocating power tool of claim 9, wherein, during a return stroke of the reciprocating mechanism:
the first end portion of the reciprocating shaft is configured to move in the second direction away from the longitudinal centerline of the at least one guide slot from the first side of the at least one guide slot in response to movement of the at least one roller in a second longitudinal direction along the contoured portion of the contoured guide surface of the at least one guide slot; and
the second end portion of the reciprocating shaft is configured to move in the first direction away from the longitudinal centerline of the at least one guide slot from the second side of the at least one guide slot in response to the movement of the at least one roller in the second longitudinal direction along the contoured portion of the contoured guide surface of the at least one guide slot.

11. The reciprocating power tool of claim 1, wherein the first direction is substantially orthogonal to the longitudinal centerline of the at least one guide slot, and the second direction is substantially orthogonal to the longitudinal centerline of the at least one guide slot.

12. The reciprocating power tool of claim 1, further comprising a selection mechanism configured to provide for selection of an operation mode of a plurality of operation modes of the reciprocating power tool, the plurality of operation modes including:
a linear mode of operation in which a reciprocating motion of the reciprocating shaft follows a linear path; and
at least one orbital mode of operation in which the reciprocating motion of the reciprocating shaft follows an orbital path.

13. A reciprocating device, comprising:
a guide bracket fixed to a housing;
a bushing movably coupled to the housing;
a reciprocating shaft, including:
a first end portion movably received in the guide bracket;
a second end portion configured to be coupled to an accessory tool; and
an intermediate portion movably received in the bushing; and
at least one roller coupled to the first end portion of the reciprocating shaft,
wherein the guide bracket includes a guide slot defining a guide surface having a curved contour, wherein the guide surface is configured to guide a rolling motion of the at least one roller as the reciprocating shaft reciprocates relative to the guide bracket,
wherein, in response to movement of the at least one roller along the guide surface, the first end portion of the reciprocating shaft moves in a first direction with respect to a longitudinal centerline of the guide slot, and the second end portion of the reciprocating shaft moves in a second direction, opposite the first direction.

14. The reciprocating device of claim 13, wherein the first direction is substantially orthogonal to the longitudinal centerline of the guide slot, and the second direction is substantially orthogonal to the longitudinal centerline of the guide slot.

15. The reciprocating device of claim 13, wherein the at least one roller includes:
a first roller rotatably coupled to a first side of the first end portion of the reciprocating shaft; and
a second roller rotatably coupled to a second side of the first end portion of the reciprocating shaft,
wherein the first roller and the second roller are configured to roll along the curved contour of the guide surface defined in the guide slot of the guide bracket as the reciprocating shaft reciprocates.

16. The reciprocating device of claim 13, wherein the guide surface of the guide slot includes:
a base portion;
a ramped portion; and
a curved transition portion extending between the base portion and the ramped portion,
wherein the ramped portion is oriented at an angle with respect to the base portion, away from the longitudinal centerline of the guide slot.

17. The reciprocating device of claim 13, wherein the curved contour of the guide surface extends from a first end portion to a second end portion of the guide slot.

18. The reciprocating device of claim 13, wherein:
during an out stroke of the reciprocating device:
the first end portion of the reciprocating shaft moves in the first direction toward the longitudinal centerline of the guide slot from a first side of the guide slot in response to movement of the at least one roller in a first longitudinal direction along the guide surface of the guide slot; and
the second end portion of the reciprocating shaft moves in the second direction toward the longitudinal centerline of the guide slot from a second side of the guide slot in response to the movement in the first longitudinal direction of the at least one roller along the guide surface of the guide slot, and
during a return stroke of the reciprocating device:
the first end portion of the reciprocating shaft moves in the second direction away from the longitudinal centerline of the guide slot from the first side of the guide slot in response to movement of the at least one roller in a second longitudinal direction along the guide surface of the guide slot; and
the second end portion of the reciprocating shaft moves in the first direction away from the longitudinal centerline of the guide slot from the second side of the guide slot in response to the movement of the at least one roller in the second longitudinal direction along the guide surface of the guide slot.

19. The reciprocating device of claim 13, wherein the reciprocating device is configured to be installed in a reciprocating power tool that is operable in a plurality of operation modes, including:
a linear mode of operation in which a reciprocating motion of the reciprocating shaft follows a linear path; and
at least one orbital mode of operation in which the reciprocating motion of the reciprocating shaft follows an orbital path.

* * * * *